(12) United States Patent
Floyd et al.

(10) Patent No.: US 9,243,944 B2
(45) Date of Patent: Jan. 26, 2016

(54) ADJUSTABLE UNDERGROUND METER INSTALLATION

(75) Inventors: Scott P. Floyd, Whitwell, TN (US); Bobby W. Pope, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 344 days.

(21) Appl. No.: 13/460,956

(22) Filed: May 1, 2012

(65) Prior Publication Data
US 2013/0294840 A1 Nov. 7, 2013

(51) Int. Cl.
| | |
|---|---|
| *F16L 5/00* | (2006.01) |
| *E02D 17/04* | (2006.01) |
| *E02D 29/12* | (2006.01) |
| *G01F 15/18* | (2006.01) |
| *E03B 9/08* | (2006.01) |

(52) U.S. Cl.
CPC . *G01F 15/18* (2013.01); *E03B 9/08* (2013.01); *F16L 5/00* (2013.01); *E02D 29/12* (2013.01); *Y10T 137/7014* (2015.04); *Y10T 137/7017* (2015.04)

(58) Field of Classification Search
CPC .............. E21D 1/08; E03B 7/095; E03B 9/08; E03B 9/10; E03F 5/02; E02D 29/12; E02D 29/121; E02D 23/08
USPC ........ 405/133, 272; 285/302, 303; 403/109.1, 403/109.2, 104; 137/369, 370
See application file for complete search history.

(56) References Cited

U.S. PATENT DOCUMENTS

| | | | | |
|---|---|---|---|---|
| 219,098 | A * | 9/1879 | Jewell | 285/302 |
| 420,044 | A * | 1/1890 | Dennis | 137/370 |
| 469,005 | A * | 2/1892 | Anderson | 285/303 |
| 479,909 | A * | 8/1892 | Hurley | 285/303 |
| 503,818 | A * | 8/1893 | Watt | 285/303 |
| 620,588 | A | 3/1899 | Hoppes | |
| 627,911 | A | 6/1899 | Estill | |
| 754,414 | A * | 3/1904 | Bossert | 285/303 |
| 1,101,908 | A | 6/1914 | Dennison | |
| 1,151,132 | A | 8/1915 | Stary | |
| 1,158,471 | A | 11/1915 | Felstead | |
| 1,608,772 | A | 11/1926 | Cole | |
| 2,038,806 | A | 4/1936 | Sellar | |
| 2,046,330 | A | 7/1936 | Leoffert | |
| 2,099,479 | A | 11/1937 | Heinkel | |

(Continued)

FOREIGN PATENT DOCUMENTS

| | | |
|---|---|---|
| CA | 2679774 | 3/2010 |
| EP | 1422353 | 5/2004 |

(Continued)

OTHER PUBLICATIONS

Floyd, Scott D.; U.S. Patent Application Entitled; Adjustable Underground Meter Installation; U.S. Appl. No. 12/564,459, filed Sep. 22, 2009, 17 pgs.

(Continued)

*Primary Examiner* — Frederick L Lagman
(74) *Attorney, Agent, or Firm* — Taylor English Duma, LLP

(57) ABSTRACT

A pit liner includes an upper section, a lower section, at least one pin wherein each pin is connected to one of the upper section and the lower section, and at least one notch defined in at least one of the upper section and the lower section the lower section and the upper section sized to adjust with respect to each other.

22 Claims, 8 Drawing Sheets

(56) References Cited

U.S. PATENT DOCUMENTS

| | | | |
|---|---|---|---|
| 2,511,209 A | | 6/1950 | Johnson |
| 2,748,261 A | * | 5/1956 | Wolar .......................... 285/303 |
| 2,931,383 A | * | 4/1960 | Handley ....................... 137/369 |
| 4,046,279 A | * | 9/1977 | Rosler .......................... 285/303 |
| 4,305,282 A | | 12/1981 | Hunt |
| 4,526,241 A | * | 7/1985 | Anders ......................... 285/303 |
| 4,905,725 A | * | 3/1990 | Sinkinson et al. ............. 137/370 |
| 5,221,064 A | | 6/1993 | Hodges |
| 5,333,750 A | | 8/1994 | McKinnon |
| 5,588,766 A | * | 12/1996 | Lai ................................ 403/104 |
| 5,671,772 A | * | 9/1997 | Bliss ............................. 137/370 |
| 5,979,490 A | | 11/1999 | Mirlisena, Sr. |
| 6,820,646 B2 | | 11/2004 | Helle |
| 6,820,698 B2 | * | 11/2004 | Haynes ......................... 166/381 |
| 8,568,246 B2 | * | 10/2013 | Wall et al. ................. 403/109.1 |
| 9,032,989 B2 | | 5/2015 | Floyd et al. |

FOREIGN PATENT DOCUMENTS

| | | | | |
|---|---|---|---|---|
| GB | 2033517 A | * | 5/1980 | ............. F16L 27/12 |
| GB | 2194576 | | 3/1988 | |
| JP | 53009038 | | 1/1978 | |

OTHER PUBLICATIONS

Floyd, Scott P.; Non-Final Office Action for U.S. Appl. No. 12/564,459, filed Sep. 22, 2009, mailed Feb. 10, 2012, 15 pgs.

Floyd, Scott P.; Final Office Action for U.S. Appl. No. 12/564,459, filed Sep. 22, 2009, mailed Oct. 15, 2013; 21 pgs.

Floyd, Scott P.; Non-Final Office Action for U.S. Appl. No. 12/564,459, filed Sep. 22, 2009, mailed Dec. 12, 2013; 22 pgs.

Floyd, Scott P.; U.S. Provisional application entitled: Adjustable Underground Meter Installation, having U.S. Appl. No. 61/098,986, filed Sep. 22, 2008, 8 pgs.

Floyd, Scott P.; Advisory Action for U.S. Appl. No. 12/564,459, filed Sep. 22, 2009, mailed Jul. 13, 2012, 4 pgs.

Floyd, Scott P.; Final Office Action for U.S. Appl. No. 12/564,459, filed Sep. 22, 2009, mailed May 9, 2012; 14 pgs.

Floyd, Scott P.; Applicant-Initiated Interview Summary for U.S. Appl. No. 12/564,459, filed Sep. 22, 2009, mailed Jul. 5, 2012; 3 pgs.

Floyd, Scott P.; Office Action from Canadian Intellectual Property Office for Application No. 2,679,774, filed Jan. 22, 2009, mailed Feb. 18, 2011; 2 pgs.

Floyd, Scott P.; Non-Final Office Action for U.S. Appl. No. 12/564,459, filed Sep. 22, 2009, mailed Sep. 26, 2012; 17 pgs., Mar. 22, 2014.

Floyd, Scott P.; Non-Final Office Action for U.S. Appl. No. 12/564,459, filed Sep. 22, 2009, mailed May 10, 2013, 11 pgs.

Floyd, Scott P.; Final Office Action for U.S. Appl. No. 12/564,459, filed Sep. 22, 2009, mailed Jan. 25, 2013; 16 pgs.

Floyd, Scott P.; Final Office Action for U.S. Appl. No. 12/564,459, filed Sep. 22, 2009, mailed Apr. 1, 2014, 20 pgs.

Floyd, Scott P.; Non-Final Office Action for U.S. Appl. No. 12/564,459, filed Sep. 22, 2009, mailed Sep. 26, 2014, 15 pgs.

Floyd, Scott P.; Final Office Action for U.S. Appl. No. 12/564,459, filed Sep. 22, 2009, mailed Jan. 2, 2015, 14 pgs.

Floyd, Scott P.; Issue Notification for U.S. Appl. No. 12/564,459, filed Sep. 22, 2009, mailed Apr. 29, 2015, 1 pg.

Floyd, Scott P.; Notice of Allowance for U.S. Appl. No. 12/564,459, filed Sep. 22, 2009, mailed Feb. 12, 2015, 7 pgs.

Floyd, Scott P.; Supplemental Notice of Allowability for U.S. Appl. No. 12/564,459, filed Sep. 22, 2009, mailed Apr. 17, 2015, 4 pgs.

Floyd, Scott P.: U.S. Divisional Application entitled: Adjustable Underground Meter Installation, having U.S. Appl. No. 14/677,551, filed Apr. 2, 2015, 17 pgs.

* cited by examiner

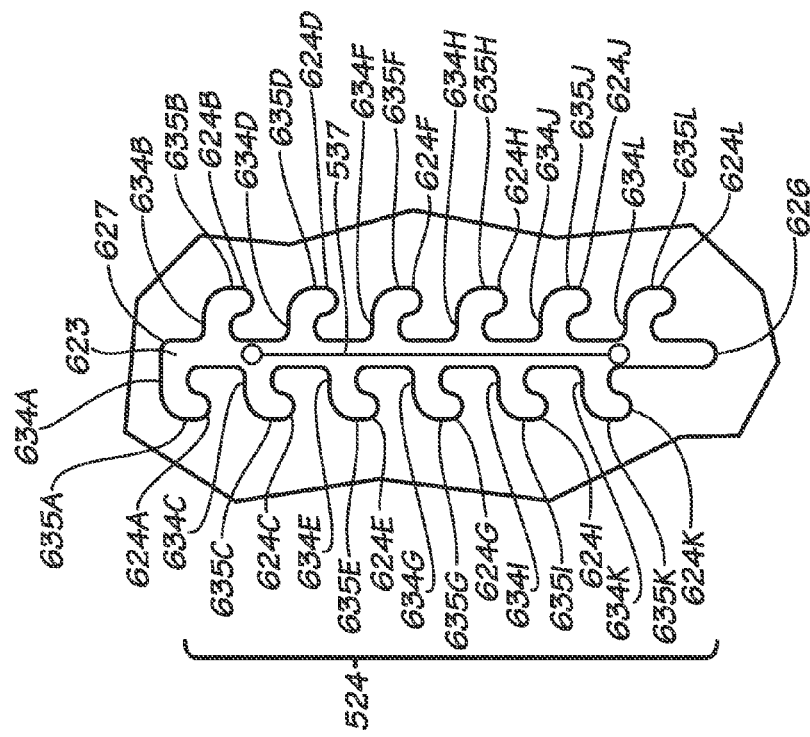
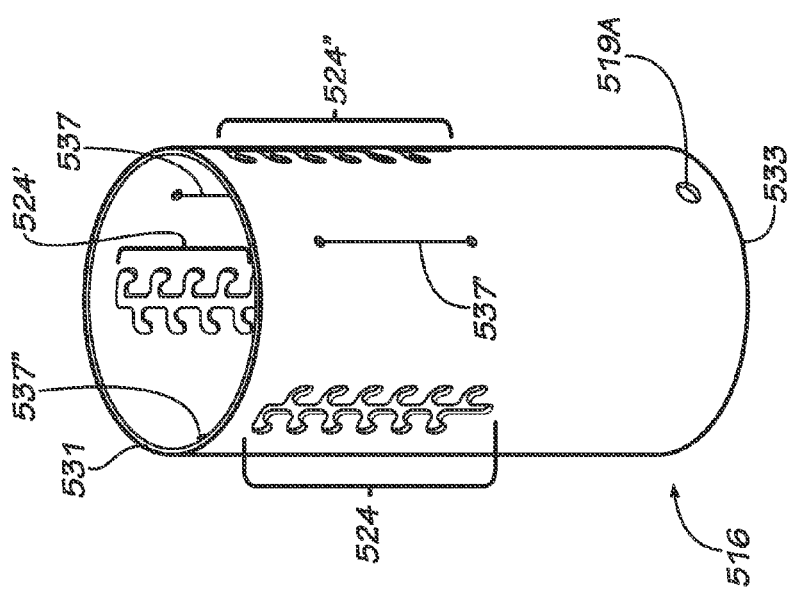

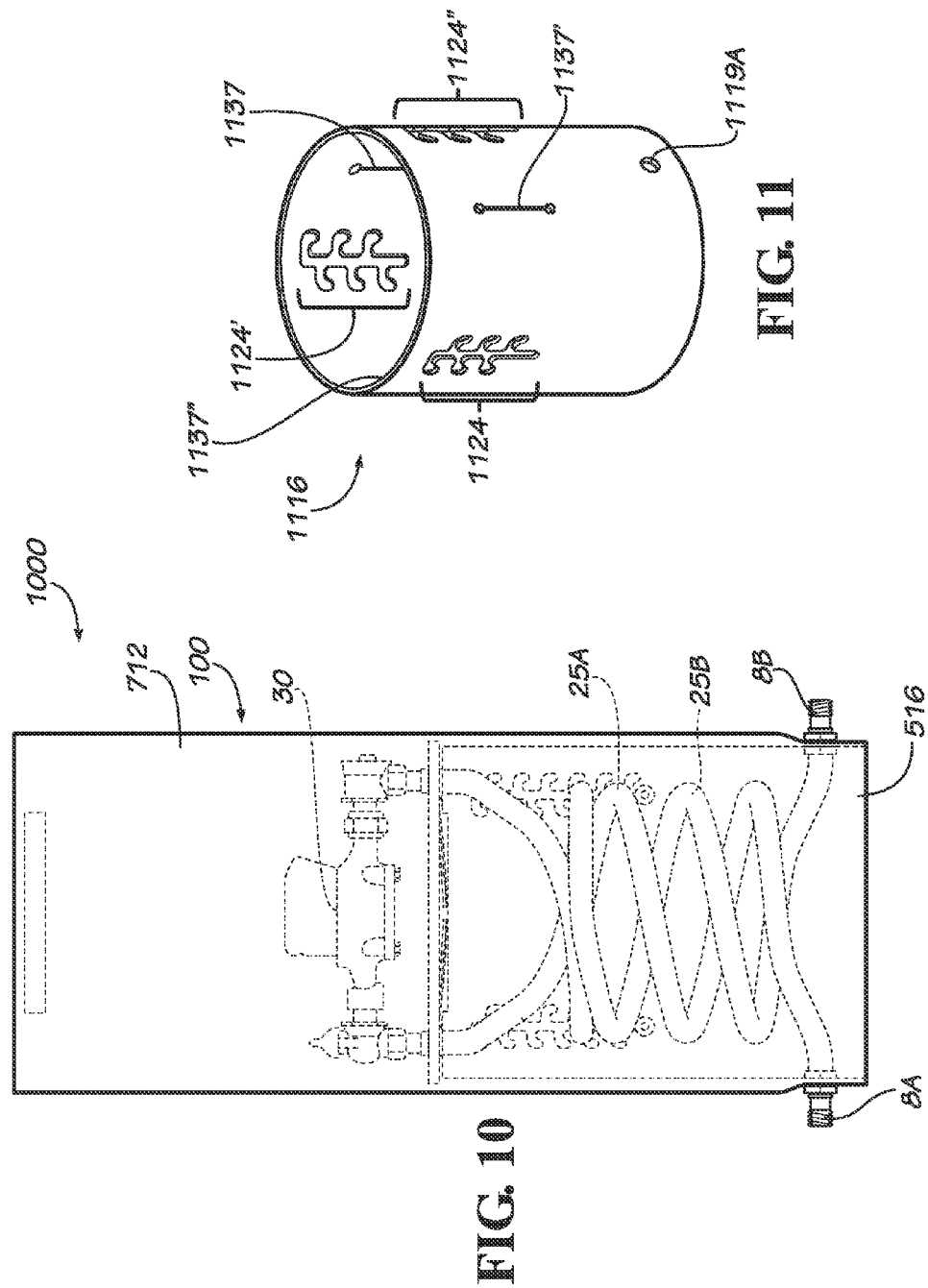

ADJUSTABLE UNDERGROUND METER INSTALLATION

CROSS-REFERENCE TO RELATED APPLICATIONS

This application incorporates by reference U.S. patent application Ser. No. 12/564,459, Sep. 22, 2009, which claims priority benefit to U.S. Provisional Patent Application No. 61/098,986, filed Sep. 22, 2008, in its entirety. This application also incorporates by reference U.S. Provisional Patent Application No. 61/098,986, filed Sep. 22, 2008, in its entirety.

FIELD

Embodiments of the present disclosure generally relate to meters for underground piping systems. In particular, embodiments of the present disclosure provide improved meter installations where access to a water meter is provided through a meter pit extending beneath the surface of the earth.

BACKGROUND

In geographical areas where the prevailing temperature may be below freezing a substantial portion of the year, pipelines carrying liquid, particularly water pipelines, are laid a sufficient depth below the earth's surface to prevent freezing of the liquid carried by the pipelines. In practice, such pipelines may be laid as much as ten feet below ground level. In less cold areas, the pipelines may be laid a few feet or less below the earth's surface. In order to monitor liquid flow, flow meters are often coupled to the pipeline at selected positions. For example, a meter may be installed in the pipeline leading from a water main to a residential, commercial, or industrial user. Access to the meter is often provided by a lined meter pit so that access to the meters can be had from ground level.

U.S. Pat. No. 4,305,282 discloses a meter pit liner for use with underground pipelines. Sections of the pipeline extend into the pit and are connected to flexible tubing. The flexible tubing is then connected to a meter. The flexible tubing allows the meter to be raised towards ground level to provide access to the meter. The meter pit liner itself, however, has a fixed length.

An issue that can arise with the installation of meter pits is that the final grade of the earth surrounding the pit is not known when the pit is installed. As a result, the liner may be too long and extend above the final grade or too short and not provide sufficient protection for the meter pit. Accordingly, a need exists for improved meter pits.

SUMMARY

Various embodiments of the present disclosure provide adjustable pit liners and installation methods for surface accessible devices connected to underground pipelines. In one embodiment, a pit liner for installing a surface accessible device below ground level and in fluid communication with an underground pipeline is provided. The pit liner includes a tubular structure having an upper section and a lower section, wherein the upper section and the lower section are slideably connected in a telescoping relationship and wherein the lower section defines one or more apertures extending through a wall of the lower section. A first section of tubing is connected at one end to the pipeline through the one or more apertures in the wall of the lower section and connected at its other end to the surface accessible device and a second section of tubing is connected at one end to the pipeline through the one or more apertures in the wall of the lower section and connected at its other end to the surface accessible device. The first and second sections of tubing allow movement of the device between a lower position within the tubular structure and an upper position. A locking mechanism is also provided that selectively discourages relative axial movement in at least one direction between the upper section and the lower section to facilitate height adjustments of the tubular structure by selectively permitting the upper section to slide relative to the lower section such that the top of the upper section can be positioned proximate the ground level.

In a further embodiment, a method for installing a surface accessible device below ground level in fluid communication with an underground pipeline is provided. The method includes the steps of: forming a pit in the earth's surface; placing a lower section of a pit liner into the pit, wherein the lower section defines one or more apertures extending through a wall of the lower section; slideably connecting an upper section to the lower section in a telescoping relationship to form a pit liner; installing the surface accessible device in the pit liner; adjusting the position of the upper section in relation to the lower section such that an end of the upper section is proximate the ground level; releasably locking the upper section relative to the lower section; and connecting the surface accessible device in fluid communication with the pipeline through the one or more apertures.

BRIEF DESCRIPTION OF THE FIGURES

Reference will now be made to the accompanying drawings, which are not necessarily drawn to scale, and wherein:

FIG. 5 is a perspective view of a lower section of a pit liner in accord with one embodiment of the current disclosure.

FIG. 6 is a detail view of a notch array of the lower section of FIG. 5.

FIG. 10 is side view of the underground metering system of FIG. 8 with internal components shown in dotted lines.

FIG. 11 is a perspective view of a lower section of the pit liner of the current disclosure in accord with one embodiment of the current disclosure.

DETAILED DESCRIPTION

The present disclosure will now provide a more detailed description with reference to the accompanying drawings, in which some embodiments, but not all embodiments, are shown. Indeed, these embodiments may be in many different forms, and the disclosure should not be construed as limited to the embodiments set forth herein. Rather, these embodiments are provided so that this disclosure will satisfy applicable legal requirements. Like numbers refer to like elements throughout.

Various embodiments of the present disclosure provide adjustable pit liners, underground meter installations, and installation methods for surface accessible devices connected to underground pipelines. The pit liners provide surface access to devices in fluid communication with the pipeline. The adjustability of the pit liners facilitates installation of the pit liners before the final grade surrounding the pit is known. Various embodiments of the present disclosure may be used with pipelines carrying liquid or gas, and the devices may be valves, flow meters, or other known pipeline devices. To facilitate understanding, embodiments of the present disclosure will be described in the context of a flow meter and a pipeline carrying a liquid, such as water.

Figure 1:
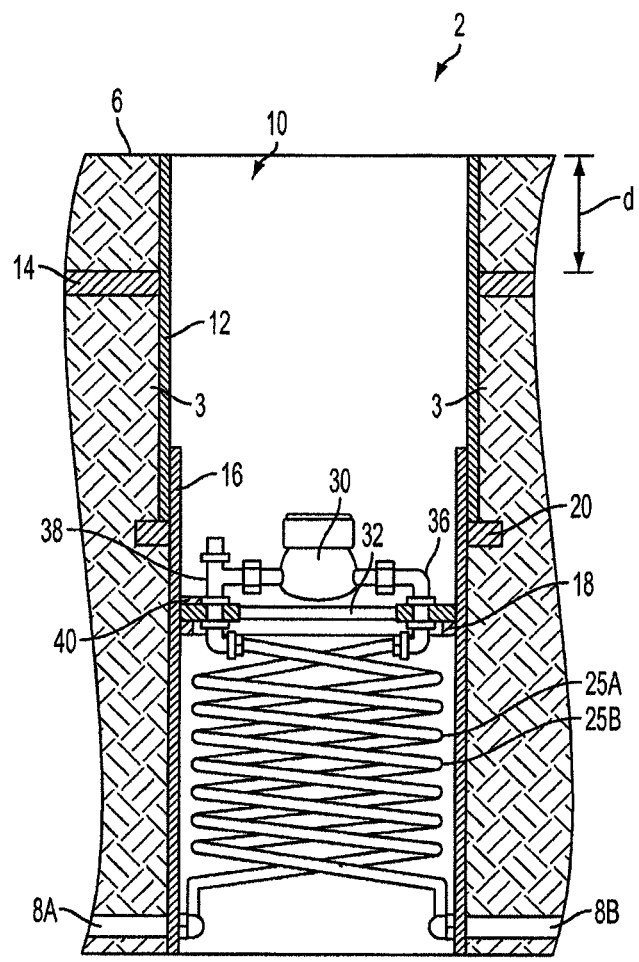
FIG. 1 is a cross-section view of an underground meter installation in accordance with an embodiment of the current disclosure.

FIG. 1 illustrates a pit 2 extending below the surface of the earth 3. The ground level is indicated by the numeral 6, and two sections of a pipeline 8A,B are laid below ground level and extend into the pit 2.

In practice, if the underground pipeline is used to carry water in a cold area, they may be laid as much as ten to twelve feet below ground level to keep it below the frost line. Otherwise, water within the pipeline might freeze, thus impeding water flow and possibly rupturing the pipeline. In other areas, the pipeline may be laid only a few feet below ground level.

The pit 2 is defined by a tubular liner 10 and the pipeline sections 8A,B extend into the pit 2 through suitable openings in the liner 10. In the illustrated embodiment, the liner 10 has a circular cross-section, but as will be appreciated by those skilled in the art, the liner 10 may have any desired cross-sectional shape. Also, the liner 10 may be constructed of plastic and/or metal, and/or any other suitably strong material.

The liner 10 includes an upper section 12 and a lower section 16 connected in a telescoping arrangement. In some embodiments, the upper section 12 may overlap the lower section 16 by at least three inches when fully extended. A locking mechanism 20 releasably secures the upper and lower sections together such that relative axial movement is discouraged. The locking mechanism may take the form of a ratchet mechanism, a latch, a locking pin that engages one of a plurality of holes defined in one or both of the upper and lower sections, a friction clamp, screw threads or any other known or developed mechanisms for releasably locking two elements. In some embodiments, the height adjustment comprises a selection between predetermined heights (e.g., ratchet mechanism, pin/hole arrangement). In other embodiments, the height may be selected anywhere between a minimum and a maximum height (e.g., a friction clamp).

Figure 3:
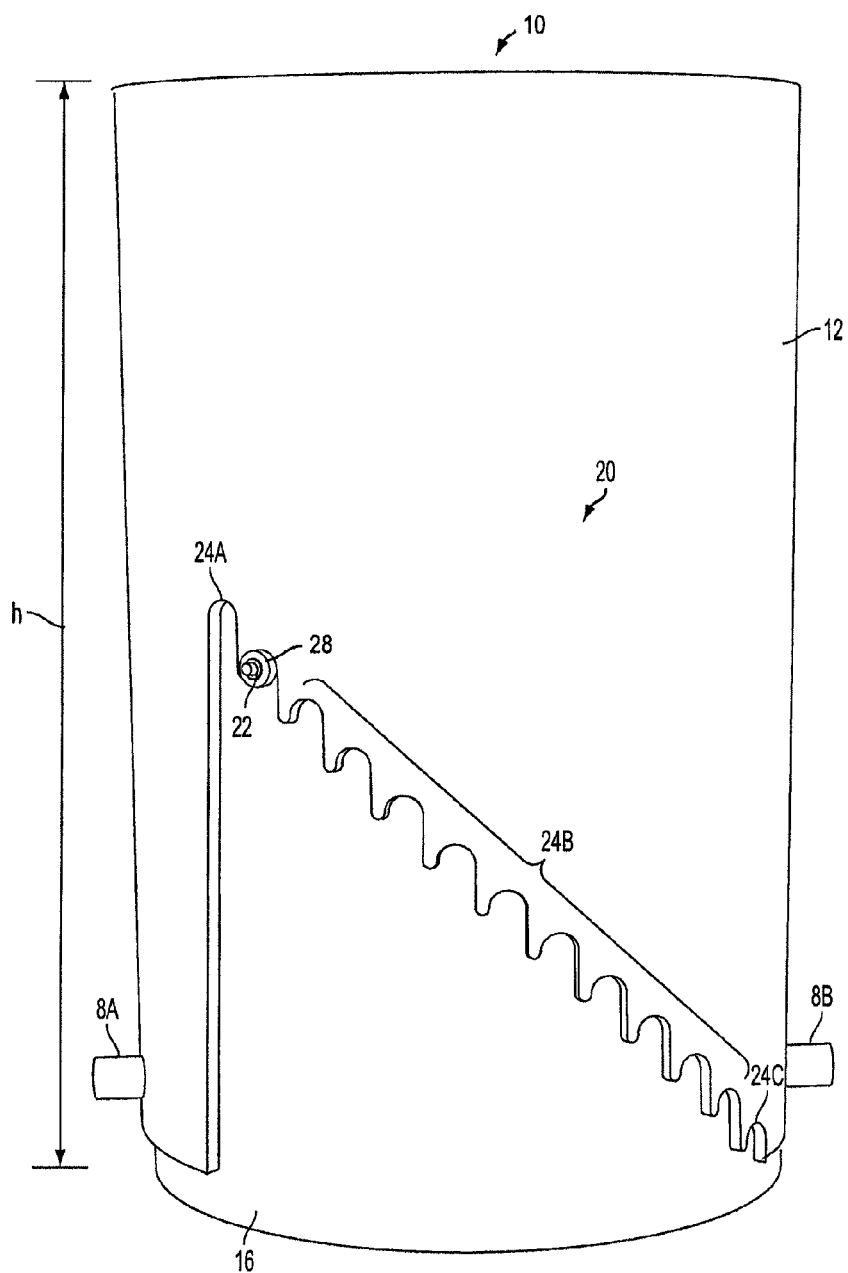
FIG. 3 is a side view of a pit liner in accordance with an embodiment of the current disclosure.

FIG. 3 illustrates one possible ratchet mechanism that may be used in accordance with an embodiment of the present disclosure. In this embodiment, the locking mechanism 20 includes a pin 22 secured to the lower section 16 that selectively engages one of a plurality of notches formed in the upper section 12. In the illustrated embodiment, the pin 22 is secured proximate the middle of the lower section 16, but could be located at other positions on the lower section 16, as desired. In various embodiments, the pin 22 may support a washer or roller 28 to facilitate engagement with the notches.

The illustrated notches are substantially curvilinear; however, it should be understood that the notches in other embodiments may have different shapes, which are configured to engage the pin 22. In various embodiments, a pathway is provided to allow the pin to selectively move between notches to adjust the overall height of the liner 10. FIG. 3 illustrates one series of notches for adjusting the height "h" of the upper section 12 relative to the lower section 16. Other embodiments may include two or more circumferentially-spaced series of notches on the upper section 12 with associated pins secured to the lower section 16. The respective notches between the different series may be axially aligned. For example, respective pins could selectively engage the top notch of different series of notches at the same time.

The liner 10 is at its lowest height "h" when the pin 22 engages notch 24A and at its tallest height when the pin 22 engages notch 24C. The intermediate notches 24B cascade axially and circumferentially between the notch 24A and the notch 24C. These intermediate notches 24B provide intermediate height adjustments for the liner 10. In the illustrated embodiment, adjacent notches represent approximately one inch height difference. Some embodiments may not include an intermediate notch while others may have one or more intermediate notches. The height difference between adjacent notches may be more or less than one inch.

To adjust the height of the illustrated embodiment, the upper section 12 is slideably extended to disengage the pin 22 from one of the notches. The upper section 12 is then rotated and extended (or retracted) such that the pin is aligned with the desired notch and the upper section is then retracted with respect to the lower section 16 until the pin 22 engages the desired notch. The weight of the upper section 12 aids in retaining the engagement between the pin 22 and the desired notch. Engagement between the notch and the pin 22 maintains the overall height "h" of the assembly by discouraging the upper section 12 from retracting relative to the lower section 16 in an axial direction.

An advantage of the illustrated ratcheting embodiment is that the height of the liner 10 may be adjusted, either taller or shorter, by grasping and moving the upper section 12. Direct access to the locking mechanism, which may be deep within the pit, it not necessary. Thus, clearance between the pit 2 and the liner 10 can be minimal Additionally, height adjustments may be possible even after the liner 10 has been backfilled. Other types of locking mechanism may require access to the actual locking mechanisms to provide adjustment, which could require removal of backfill material or additional clearance between the pit and the liner 10 to provide access.

Figure 4:
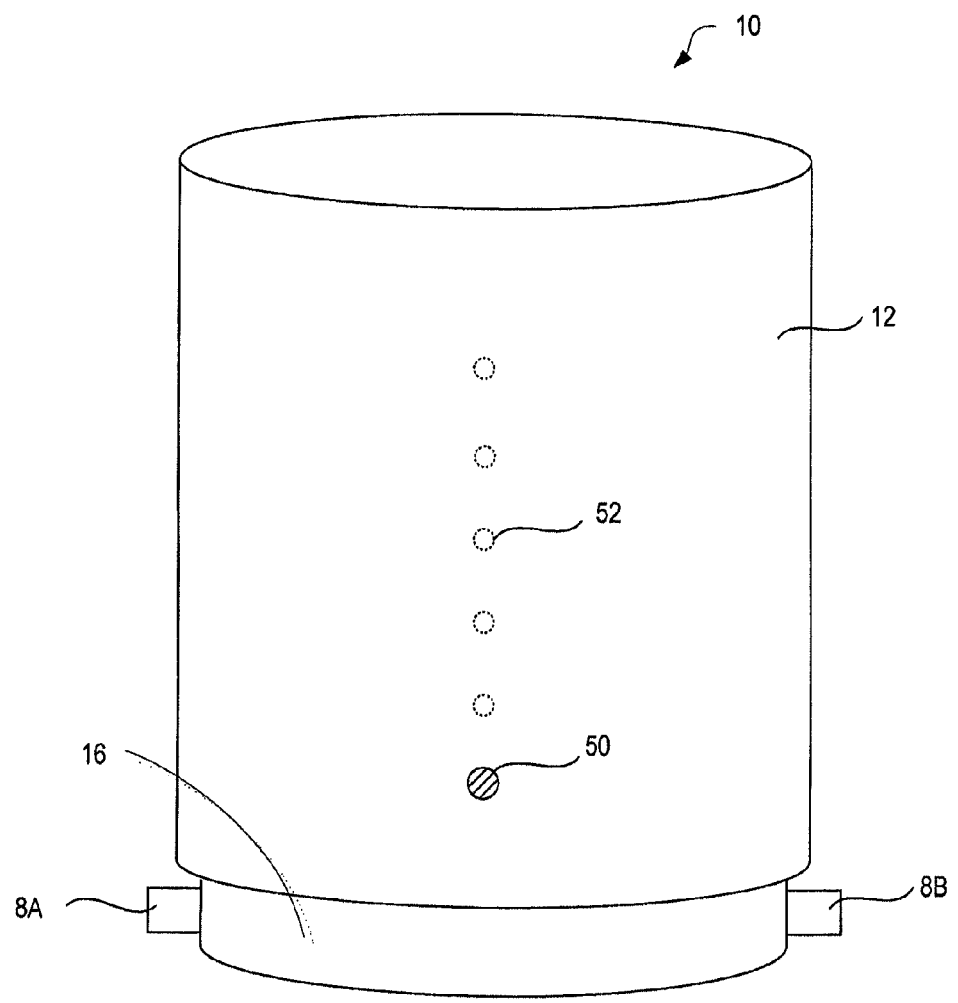
FIG. 4 is a side view of a pit liner in accordance with an embodiment of the current disclosure.

FIG. 4 illustrates another embodiment of the locking mechanism. In this embodiment, the locking mechanism comprises a pin 50 that is configured to selectively engage one of a plurality of apertures 52 formed in the lower section 16 through an aperture formed in the upper section (not shown). In use, the upper section 12 is adjusted axially until the aperture formed in the upper section (not show) aligns with the desired aperture 52 formed in the lower section 16. The pin 50 is then placed into the aligned apertures.

Returning to FIG. 1, the upper section 12 of the liner 10 may include a support flange 14. The support flange 14 extends radially outwardly from the outer surface of the upper section 12 at a distance "d" from the top of the upper section 12. In use, the support flange 14 can further discourage movement of the upper section due to engagement of dirt backfilled around the liner 10 when installed.

The lower section 16 may include a support ledge 18 formed on its interior surface. As discussed in greater detail below, the support ledge 18 engages the meter platform 32 when the platform is at its lowermost position.

As noted above, the pipeline sections 8A,B extend into the pit 2 through suitable holes defined by the liner 10. Two lengths of pre-coiled flexible tubing 25A,B within the meter pit 2 are connected to the respective pipe sections 8A,B. The pre-coiled tubing 25A,B can be, for example, formed from plastic, such as polyethylene, or other suitable material. As will be appreciated by those skilled in the art, pipe fittings may be attached to the ends of the pipe sections 8A,B and these fittings may extend into the pit 2 through the liner 10 as opposed to the pipe sections themselves. The fittings may facilitate connection between the pipe sections 8A,B and the two lengths of flexible tubing 25A,B, respectively.

The opposite ends of the two lengths of flexible tubing are in fluid communication with a flow meter 30. In various embodiments, one of the lengths of flexible tubing is connected to the flow meter 30 through a coupling 36. The other length of flexible tubing may be connected to the flow meter 30 via a valve 38. A benefit of the valve 38 is to allow a user to stop the flow of liquid through the flow meter 30 to perform maintenance on the flow meter 30. As will be understood by those skilled in the art, the flow meter 30 may be connected to the lengths of flexible tubing through one or more valves and/or couplings.

In various embodiments, the flow meter 30 is mounted to a platform 32. The platform 32 may define suitable apertures to facilitate connection of the flow meter 30 to the lengths of flexible tubing 25A,B. The platform 32 may be annular to permit the upward flow of warm air that may result from circulation induced by a temperature differential between the top and the bottom of the pit.

A latch 40 may be slidably mounted to the platform 32. As discussed in greater detail below, this latch may be extended beyond the top of liner 10 to retain the platform 32 at approximately ground level when the platform 32 is raised to that elevation. In various other embodiments, the latch 40 may be extended to engage an aperture defined by the liner as opposed to the top of the liner 10.

Embodiments of the present disclosure may be installed on new or existing pipelines. A first step in installing embodiments of the present disclosure is to form a pit 2 at the desired location and to position the liner 10 such that two sections of pipe 8A,B extend through suitable apertures formed in the liner 10 and terminate within the liner 10. Earth may then be partially backfilled around the liner 10 to maintain its position and orientation. In other embodiments, the two sections of pipe 8A,B do not extend into the pit but are instead connected to fittings that extend through the apertures formed in the liner 10. The fittings may be attached to the liner 10 prior to positioning the liner 10 into the pit 2.

In various embodiments, the upper section 12 and the lower section 16 are positioned into the pit as an assembly. In other embodiments, the lower section 16 may be placed in the pit and then the upper section 12 is slid onto the lower section 16. A plurality of upper sections 12 may be provided in which the different sections have different respective axial lengths. Depending on the expected overall length required of the liner 10, the appropriate length upper section 12 is selected and slid onto the lower section 16. Also, an installed upper section 12 may be removed and exchanged with a different upper section that has a different length as desired to adjust the overall length of the liner 10.

Next, two lengths of tubing 25A,B may be connected to the two pipe ends 8A,B, respectively and to the flow meter 30 through appropriate valves and connectors. After making the desired connections, the upper section 12 of the liner 10 may be raised to the desired height, such as ground level, and locked in place using the locking mechanism 20.

Once the upper section 12 is locked into place, earth may be backfilled around the liner 10. In some embodiments, earth is only backfilled up to the support flange 14 such that additional adjustments to the height of the liner 10 can be made. This can be beneficial if the final grade has not yet been established. Alternatively, the earth may be backfilled to the top of the liner 10. As will be appreciated by those skilled in the art, the liner height may be adjusted and earth backfilled around the liner 10 before or after making the connections between the pipes, the flexible tubing and the flow meter.

Figure 2:
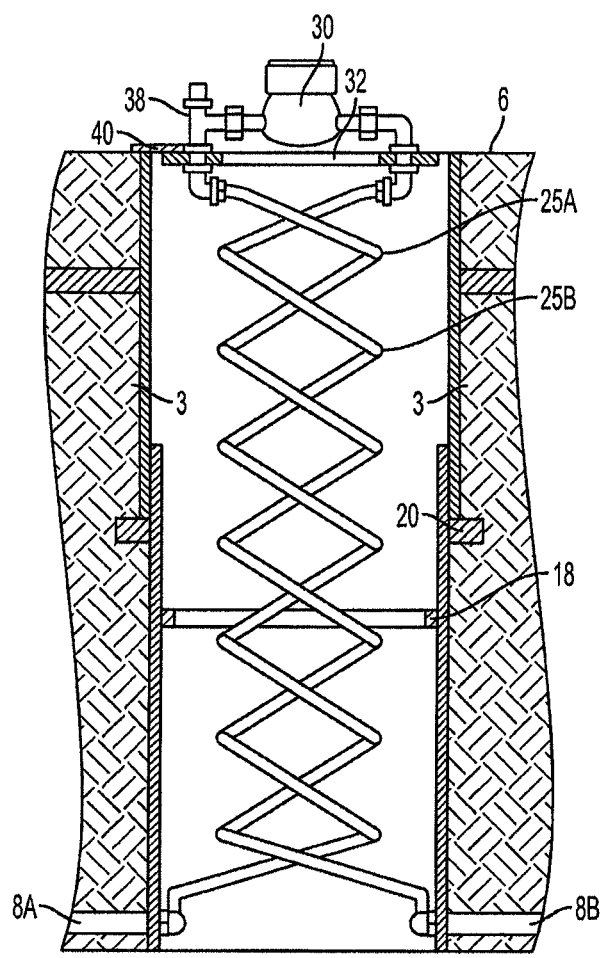
FIG. 2 is a cross-section view of the embodiment illustrated in FIG. 1 with the meter extended.

As shown in FIG. 1, the platform 32 and the flow meter 30 are in their normal lowermost operating position within the meter pit 2 where they are supported by the support ledge 18 formed in the lower section 16 of the liner 10 at a position above the coiled tubing. When access to the flow meter is desired for purposes such as meter reading, maintenance, inspection or replacement, a hook may be inserted into the meter pit 2 to engage the meter 30 or platform 32. Once engaged, the hook may be lifted to raise the flow meter 30 and its supporting platform 32 to ground level 6 as shown in FIG. 2. As the flow meter 30 and its supporting platform 32 rise, the lengths of tubing 25A,B uncoil to accommodate the upward movement. When the supporting platform 32 reaches ground level, the latch 40 may be slid into its extended position to engage the top of the liner 10 to retain the platform 32 at ground level 6. In other embodiments, a bar may be inserted beneath the supporting platform 32 to retain it at ground level 6. With the platform 32 at ground level 6, the flow meter 30 carried atop the platform 32 is also at ground level 6, and any operations to be performed on the flow meter can be done by workers at ground level without descending into the meter pit 2.

After reading or servicing the flow meter, latch 40 may be slid back towards the platform 32 and out of engagement with the top of the liner 10. The coiling force of the tubing in conjunction with the force of gravity tends to lower the platform 32 and the flow meter 30 into its lowermost position within the pit 2. The hook can be used to restrain the recoiling force of the lengths of tubing 25A,B in order to provide a smooth descent of the platform 32 and the flow meter 30 into the meter pit 2. As the platform 32 and flow meter 30 descend, the lengths of tubing 25A,B recoil. When the tubing is in its completely recoiled position, the platform and flow meter may be in their original operating position within the meter pit 2.

Another embodiment of a pit liner 100 is seen in FIGS. 5-11. FIG. 5 displays a lower section 516. The lower section 516 is a generally hollow cylindrical structure in the current embodiment, although various shapes and configurations may be used in various embodiments. The lower section 516 includes three notch arrays 524,524',524". The notch arrays 524,524',524" of the current embodiment are formed in a tree, as seen with reference to FIG. 6.

As seen in FIG. 6, the notch array denoted as 524 include a central portion 623 and steps 624A,B,C,D,E,F,G,H,I,J,K,L. The central portion 623 of the current embodiment is about straight and about aligned with the axis of the lower section 516 (seen in FIG. 5). The central portion 623 defines a guide for pin 22, as will be discussed later. Each of the steps 624A-L originates from the central portion 623. Notch arrays 524', 524" also include corresponding features to notch array 524. The notch array 524 also includes a bottom end 626 and a top end 627. In the current embodiment, the bottom end 626 is a part of the central portion 623 and the top end 627 includes the central portion 623 and the uppermost step 624A in the notch array 524. In the current embodiment, the rise—or, in other words, the height—of the notch arrays 524,524',524" is 12 inches. With twelve steps 624A,B,C,D,E,F,G,H,I,J,K,L per notch array 524, each of the notch arrays 524,524',524" comes out to twelve inches. Each step 624A-L includes a horizontal portion 634A-L and a vertical portion 635A-L. In operation, the vertical portion 635A-L of each step 624A-L acts as a detent, as will be discussed later. The location of the vertical portion 635A-L could be anywhere within the step 624A-L and should not be considered limited to the embodiment shown. More than one vertical portion 635A-L may be included per step 624A-L, and the depth of any vertical portion 635A-L should not be considered limiting. Although the current embodiment includes three sets of notch arrays 524, 524',524", any number of notch arrays 524,524',524" may be used and any number of steps 624 may be used in various embodiments. Unlike the notches 24, notch arrays 524,524', 524" are a closed array. Additionally, each step 624 is in direct proximity to the central portion 623 such that limited rotation is required to engage another step 624.

Referring back to FIG. 5, it can be clearly seen that the notch arrays 524,524',524" are located proximate a top end 531 of the lower section 516. Actual placement of the notch arrays 524,524',524" need not be proximate to either end, however, and the location of the current embodiment should not be considered limiting on the disclosure. The lower section 516 also has a bottom end 533. Relief cuts 537,537',537" are made in the lower section 516 adjacent to each of the notch arrays 524,524',524". The notch arrays 524,524',524" are cut using a water jet in the current embodiment, although the notch arrays 524,524',524" may be cut using any number of methods including vertical milling, laser, stamping, and roll-stamping, among others. The pressure of cutting can cause an out-of-round condition. As such, each relief cut 537,537', 537" provides some counter-pressure to counteract the out-of-round condition caused by cutting the notch arrays 524, 524',524" and provides some freedom of movement because the material is not restrained. In the current embodiment, the relief cuts 537,537',537" include a straight central portion and circular end portions.

Additionally, piping apertures 519A,B (519B not shown) can be seen proximate the bottom end 533. The piping apertures 519A,B allow piping to connect through the lower section 516 to aforementioned flexible tubing 25A,B and, thereby, to flow meter 30.

The height of the lower section 516 may range from 18 inches to 28 inches in the current embodiment, although various heights may be used in various embodiments, and no single height or range should be considered limiting on the disclosure. Another exemplary embodiment can be seen in FIG. 11 as lower section 1116.

Figures 7, 8:
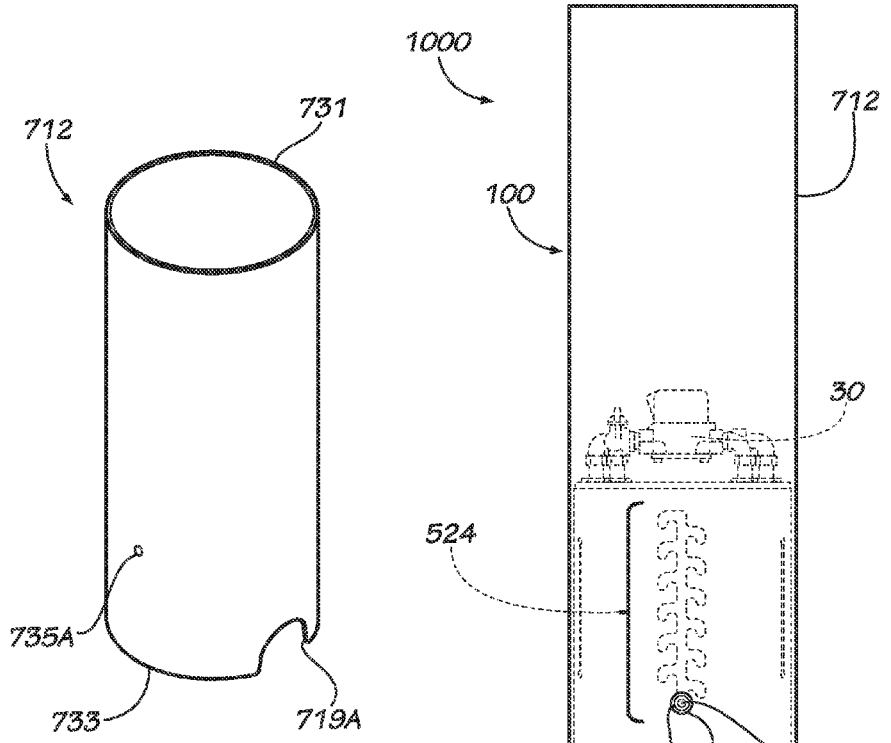
FIG. 7 is a perspective view of an upper section of a pit liner in accord with one embodiment of the current disclosure.
FIG. 8 is a side view of an underground metering system in accord with one embodiment of the current disclosure with internal components shown in dotted lines.

FIG. 7 displays an upper section 712. The upper section 712 is sized to fit around the lower section 516 with the upper section 712 and the lower section 516 being capable of telescoping in adjacent relationship. In the current embodiment, the upper section 712 telescopes to the outside of the lower section 516 and the lower section 516 telescoping to the inside of the upper section 712, although the arrangement may be reversed in various embodiments. The upper section 712 is a generally hollow cylindrical tube structure in the current embodiment, although various shapes and configurations may be used in various embodiments. An inverse relationship is also considered within the disclosure. The upper section 712 includes a top end 731 and a bottom end 733. The height of the upper section 712 is dependent on customer specifications and may range from 36 inches to 120 inches in the current embodiment, although various heights may be used in various embodiments, and no single height or range should be considered limiting on the disclosure.

Defined proximate the bottom end 733 of the upper section 712 are two piping reliefs, 719A,B (719B not shown). The upper section 712 also defines two pin apertures 735A,B (735B not shown) for attachment of pin 22 (not shown). In the current embodiment, pin 22 is fixedly attached to the upper section 712, as will be described later. Pins 22',22" also are connected to the lower section 516 for engagement of the notch arrays 524',524".

The interaction of the upper section 712 and the lower section 516 can be seen in FIG. 8 to form the pit liner 100 as part of an adjustable underground meter system 1000. In the view of FIG. 8, the flow meter 30 and the pipe sections 8A,B can be seen as parts of the adjustable underground meter system 1000 in addition to the pit liner 100. The pipe sections 8A,B extend through piping apertures 819A,B in the lower section 516. As can be seen, the upper section 712 is in its lowest point because the pin 22 is in contact with the bottom end 626. From this point, the upper section 712 can be telescoped upward and ratcheted into any of the steps 624A-L, 624A'-L', 624A"-L" of the notch arrays 524,524',524" (524', 524" not shown).

The upper section 712 and the lower section 516 are made of ASTM D2241 PVC plastic in the current embodiment, although other grades of plastic may be used in various embodiments, as may aluminum, high density polyethylene, polyethylene, stainless steel, and carbon fiber, among others. Particularly, higher strength materials may be required for use with a traffic rated application. The upper section 712 and the lower section 516 are within SDR 51 ratios for the diameter to wall thickness of the current embodiment, although no single ratio should be considered limiting on the disclosure, and the wall thickness need not be tied to the diameter in all applications.

Figure 9:
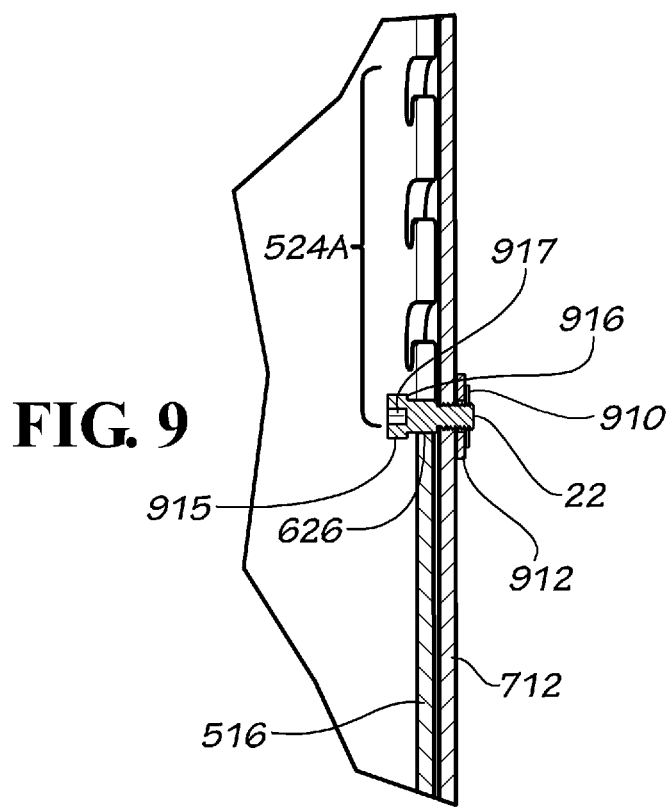
FIG. 9 is a detail cutaway view of the interaction of the upper section of FIG. 7 with the lower section of FIG. 5.

FIG. 9 shows a cutaway view of the interaction between the pin 22 and the bottom end 626 of the notch array 524. For each set of notch arrays 524,524',524", a similar pin 22 would also engage the bottom end 626. In the current embodiment, the pin 22 is a shoulder bolt that attaches to a threaded insert 910 and is secured by a washer 912. As such, the pin 22 does not move with respect to the upper section 712 but may engage various portions of the notch arrays 524,524',524" to adjust the height of the pit liner 100. Although the pin 22 is shown as a shoulder bolt in the current embodiment, the configuration or shape of the pin 22 as shown should not be considered limiting on the disclosure. Moreover, the pin 22 may be integral with the upper section 712 or the lower section 516 in some embodiments. The pin 22 may be rectangular, ovular, or various other shapes in various embodiments. Additionally, a head 915 of the pin 22 is seen in the cross-sectional view of the current embodiment. The head 915 provides a pullout stop shoulder 916 for the pin 22 to prevent unintended release of the lower section 516 and also includes a hex screw portion 917 to aid in seating the threaded insert 910.

In some applications a cover (not shown) may be attached to the bottom end 533 of the lower section 516 to prevent dirt, fluid, or other debris from entering into the system.

FIG. 10 shows a partial cross-section view of the adjustable underground meter system 1000 including the pit liner 100 and flexible tubing 25A,B as well as previously-described features. The flexible tubing 25A,B can be made of various materials including rubber, polybutylene, high density polyethylene.

When the pit liner 100 is in use, each pin 22,22',22" (pins 22',22" are not shown) is engaged within the complementary notch array 524,524',524" such that each pin 22,22',22" and notch array 524,524',524" forms a locking mechanism. The upper section 712 is allowed to telescope with respect to the lower section 516 with the pins 22,22',22" protruding into the notch arrays 524,524',524". Particularly, in the current embodiment, the pins 22,22',22" engage the central portions 623,623',623" to allow such height adjustments. When a desired height of the pit liner 100 is determined, the upper section 712 is rotated with respect to the lower section 516 either clockwise or counter-clockwise to attempt to engage the pins 22,22',22" in one set of steps 624,624',624". Each of the pins 22,22',22" will engage the same step 624,624',624" in each notch array 524,524',524". Because each step 624,624', 624" includes the vertical portion 635,635',635" that acts as a detent (as previously mentioned), the pins 22,22',22" engage the vertical portions 635,635',635" the steps 624,624',624" and are substantially prevented from counter-rotation motion that otherwise could disengage the steps 624,624',624" and allow the pins 22,22',22" to fall within the central portions 623,623',623". Note, however, as shown in FIGS. 8 and 9, the pins 22 can engage the bottom ends 626,626',626" of the notch arrays 624,624',624", respectively, to allow the upper section 712 to sit at its lowest height with respect to the lower section 516.

FIG. 11 shows another embodiment of a lower section 1116. The lower section 1116 includes notch arrays 1124, 1124',1124" that have a shorter rise than the notch arrays 524,524',524" of the lower section 516. In the current embodiment, the rise—or, in other words, the height—of the notch arrays 1124,1124',1124" is 6 inches with one inch per step. The lower section 1116 includes piping apertures 1119A,B (1119B not shown) and relief cuts 1137,1137',1137".

The assembly configuration(s) included herein represent(s) an example of one of many possible assembly configurations. One skilled in the art will understand obvious variations of this assembly configuration are included within this disclosure, including variations of steps, combinations of steps, and dissections of steps, among others. Where materials are chosen for the elements of this assembly, similar material choices may also be used and would be obvious to one in the art.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

The invention claimed is:

1. A pit liner assembly comprising:
    a tubular upper section defining a first internal chamber;
    a tubular lower section defining a second internal chamber, the first internal chamber of the tubular upper section and the second internal chamber of the tubular lower section in combination defining an assembly internal chamber;
    a pin, the pin connected to one of the upper section and the lower section;
    a notch array defined in at least one of the upper section and the lower section, each pin protruding into one notch array, the array including a step, the step including a horizontal portion and a vertical portion, the lower section and the upper section sized to telescope with each other;
    a relief cut formed into each tubular section in which a notch array is defined; and
    a platform moveable within the assembly internal chamber.

2. The pit liner assembly of claim 1, wherein pin engages the notch array.

3. The pit liner assembly of claim 1, wherein the notch array is a closed array.

4. The pit liner assembly of claim 1, wherein the notch array includes a central portion.

5. The pit liner assembly of claim 1, wherein the notch array includes at least twelve steps.

6. The pit liner assembly of claim 5, wherein a rise of the notch array is about six inches.

7. The pit liner assembly of claim 1, wherein the notch array includes at least six steps.

8. The pit liner assembly of claim 1, wherein the notch array is a first notch array and the pin is a first pin, the pit liner further comprising a second notch array and a second pin, wherein the second pin engages the second notch array.

9. The pit liner assembly of claim 1, wherein the pin is connected to the section telescoping to the outside and each notch array is defined in the section telescoping to the inside.

10. The pit liner assembly of claim 1, wherein the platform is positioned on a top end of the tubular lower section.

11. The pit liner assembly of claim 1, wherein the relief cut has a straight central portion and circular end portions.

12. An underground metering system for use with a water supply, the underground metering system comprising:
    an upper section defining a central space;
    a lower section defining a central space;
    a locking mechanism selectively connecting the upper section to the lower section, the locking mechanism including a notch array defined in at least one of the upper section and the lower section, the array including a step, the step including a horizontal portion and a vertical portion;
    a relief cut formed into each tubular section in which a notch array is defined;
    a meter disposed within the central space of at least one of the upper section and the lower section; and
    flexible tubing connecting the meter with the water supply.

13. The underground metering system of claim 12, wherein the locking mechanism includes
    a pin, the pin connected to one of the upper section and the lower section, the pin protruding into the notch array, the lower section and the upper section sized to telescope with each other.

14. The underground metering system of claim 13, wherein the pin engages the notch array.

15. The underground metering system of claim 13, wherein the notch array is a first notch array and the pin is a first pin, the underground metering system further comprising a second notch array and a second pin, wherein the second pin engages the second notch array.

16. The underground metering system of claim 13, wherein the pin is connected to the section telescoping to the outside and the notch array is defined in the section telescoping to the inside.

17. The underground metering system of claim 12, wherein the notch array is a closed array.

18. The underground metering system of claim 12, wherein the notch array includes a central portion.

19. The underground metering system of claim 12, wherein the notch array includes twelve steps.

20. The underground metering system of claim 19, wherein a rise of the notch array is about twelve inches.

21. The underground metering system of claim 12, wherein the notch array includes six steps.

22. The underground metering system of claim 12, wherein the relief cut has a straight central portion and circular end portions.

\* \* \* \* \*